(12) United States Patent
Terreur et al.

(10) Patent No.: US 7,772,338 B2
(45) Date of Patent: Aug. 10, 2010

(54) USE OF A ZIEGLER-NATTA CATALYST TO MAKE A POLYPROPYLENE HOMOPOLYMER OR RANDOM COPOLYMER HAVING A HIGH MELT FLOW RATE

(75) Inventors: Valerie Terreur, Louvain-la-Neuve (BE); Jerome Gromada, Waterloo (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/298,063

(22) PCT Filed: Apr. 24, 2007

(86) PCT No.: PCT/RP2007/054005

§ 371 (c)(1),
(2), (4) Date: Feb. 5, 2009

(87) PCT Pub. No.: WO2007/122239

PCT Pub. Date: Nov. 1, 2007

(65) Prior Publication Data

US 2009/0264607 A1    Oct. 22, 2009

(30) Foreign Application Priority Data

Apr. 24, 2006 (EP) .................................. 06113011
Oct. 23, 2006 (EP) .................................. 06122764

(51) Int. Cl.
*C08F 4/44* (2006.01)

(52) U.S. Cl. .................................................. 526/124.3

(58) Field of Classification Search ................ 526/124.3
See application file for complete search history.

(56) References Cited

U.S. PATENT DOCUMENTS

| 6,403,708 | B2 | 6/2002 | Moriya et al. |
| 6,657,025 | B2 | 12/2003 | Blackmon et al. |
| 7,022,796 | B2 | 4/2006 | Blackmon et al. |
| 7,220,696 | B2 | 5/2007 | Matsunaga et al. |
| 2003/0027715 | A1 | 2/2003 | Fushimi et al. |
| 2004/0229748 | A1 | 11/2004 | Chen et al. |

FOREIGN PATENT DOCUMENTS

EP    1223181 A2    7/2002

OTHER PUBLICATIONS

Cecchin G et al.: "Polypropene Product Innovation by Reactor Granule Technology", Macromolecular Symposia, Wiley VCH Verlag, Weinheim, DE, No. 173, Jun. 2001, pp. 195-209, XP001104624, ISSN: 1022-1360.

*Primary Examiner*—Ling-Siu Choi
*Assistant Examiner*—Sonya Wright
(74) *Attorney, Agent, or Firm*—Tenley R. Krueger

(57) ABSTRACT

The present invention relates to a process for the production of a high melt flow propylene homopolymer or random copolymer with low odor and low volatiles content, which is suitable for thin-walled injection molding applications, said process comprising the step of polymerizing propylene and one or more optional comonomers in presence of a Ziegler-Natta catalyst comprising a titanium compound having at least one titanium-halogen bond, and a diether compound as internal electron donor, both supported on a magnesium halide in active form, an organoaluminium compound and an optional external donor.

20 Claims, No Drawings

USE OF A ZIEGLER-NATTA CATALYST TO MAKE A POLYPROPYLENE HOMOPOLYMER OR RANDOM COPOLYMER HAVING A HIGH MELT FLOW RATE

FIELD OF THE INVENTION

The present invention relates to a process for the production of a high melt flow propylene homopolymer or random copolymer with low odor and low volatiles content, which is suitable for thin-walled injection molding applications.

THE PRIOR ART AND THE TECHNICAL PROBLEM

Polyolefins are well known commercial polymers, which are used for a variety of molded and extruded articles. In particular, polypropylene has become widely used in the field of thin-walled injection molding applications. Advantageously, polypropylenes of high fluidity, i.e. of a melt flow index higher than 40 dg/min, are employed. Such polypropylenes allow the production of articles with very thin walls, high flow length/thickness ratios and complex geometries. They also allow the reduction of injection temperatures and pressures, thus leading to an increase in production speed and savings in energy and cost.

Polypropylenes are produced by the polymerization of propylene and one or more optional comonomers in presence of Ziegler-Natta catalysts, i.e. transition coordination catalysts, specifically titanium halide containing catalysts, or single site catalysts. Such catalysts also contain internal electron donors, with phthalates being widely used. However, due to their rather low hydrogen response, Ziegler-Natta catalysts with a phthalate as internal donor do not allow the direct production of polypropylenes with high melt flows, i.e. from 40 to 150 dg/min, without at least significant production penalties. An alternative route to such high melt flow polypropylenes is provided by visbreaking, in which usually an organic peroxide is mixed and heated together with the polypropylene, in consequence leading to a breakdown of the polymer chains.

WO 2004-113438 relates to a process for making visbroken olefin polymers comprising: a) preparing an olefin polymer mixture comprising: I. about 0.5 to about 90.0% by weight of a reactive, peroxide-containing olefin polymer material (A); and II. about 10.0 to about 99.5% by weight of an olefin polymer material (B) selected from a propylene polymer material and a butene-1 polymer material; wherein the sum of components I+II is equal to 100 wt %; b) extruding or compounding in molten state the olefin polymer mixture, thereby producing a melt mixture; and optionally c) pelletizing the melt mixture after it is cooled.

WO 02/096986 is similar to the previous one. It describes a polypropylene resin composition comprising (A) 99.8 to 80 weight parts of a polypropylene resin having a melt flow rate of 0.1 to 50 dg/min and (B) 0.2 to 20 weight parts of an olefin copolymer rubber having an intrinsic viscosity of 0.5 to 4.0 dl/g and/or a polyethylene resin having a density of 0.895 to 0.945 g/cc and a melt flow rate of 0.05 to 15 dg/min, which have undergone an ionization ray-irradiation treatment and/ or a treatment of adding 0.05 to 5 weight parts of an organic peroxide to 100 weight parts of the aforesaid polypropylene resin composition comprising (A) and (B) and then melting.

However, visbreaking with organic peroxydes poses a number of disadvantages. It is well known that organic peroxides are unstable chemicals which are difficult to handle. In addition, all the organic peroxides will release undesirable by-products upon degradation in a chemical reaction. The release of such by-products can lead to an atmosphere susceptible of explosions. This is of particular concern when peroxyde-degraded polymers are for example in silos. The by-products can also be toxic. The most common degradation by-product is, by way of example, t-butyl alcohol. Toxic by-products limit or even exclude the use of the final polymer products in many applications such as food packaging or retort packaging.

BRIEF DESCRIPTION OF THE INVENTION

We have now discovered a process that allows to produce polypropylenes with high melt flow directly in the polymerization reaction without subsequent degradation with peroxydes or other melt flow increasing agents and without a loss in production rate.

The present invention relates to a process for the production of propylene polymers having a melt flow index ranging from 45 to 150 dg/min (ASTM D 1238 condition L) directly in a polymerization reactor without the subsequent use of melt flow increasing agents, said process comprising the step of polymerizing propylene and one or more comonomers in presence of a

- a Ziegler-Natta catalyst comprising a titanium compound having at least one titanium-halogen bond, and a diether compound as internal electron donor, both supported on a magnesium halide in active form,
- an organoaluminium compound in such an amount that the aluminium concentration, by weight relative to the added monomer(s), in the polymerization medium ranges from 1 to 75 ppm,
- an external electron donor, and
- hydrogen
- wherein the molar ratio of organoaluminium compound to external electron donor ranges from 1 to 20.

In addition the present invention relates to a process for producing a article comprising the steps of (a) producing a propylene polymer having a melt flow index ranging from 45 to 150 dg/min (ASTM D 1238 condition L) directly in a polymerization reactor without the subsequent use of melt flow increasing agents, said process comprising the step of polymerizing propylene and one or more comonomers in presence of a
- a Ziegler-Natta catalyst comprising a titanium compound having at least one titanium-halogen bond, and a diether compound as internal electron donor, both supported on a magnesium halide in active form,
- an organoaluminium compound in such an amount that the aluminium concentration, by weight relative to the added monomer(s), in the polymerization medium ranges from 1 to 75 ppm,
- an external electron donor, and
- hydrogen wherein the molar ratio of organoaluminium compound to external electron donor ranges from 1 to 20, (b) recovering a propylene polymer having a melt flow index ranging from 45 to 150 dg/min (ASTM D 1238 condition L) directly from the polymerization reactor without the subsequent use of melt flow increasing agents, and (c) transforming the polymer to make an article.

The present invention also relates to the propylene polymer made by said process as well as the articles obtained by transformation of said propylene polymer.

In comparison with high melt flow polypropylenes obtained by visbreaking with peroxides, the high melt flow polypropylenes of the present invention have the following advantages:

- Low odor due to the absence of peroxydes and their degradation products in the production process,
- the absence of non-desirable or potentially hazardous by-products such as acetone or tert-butanol,
- a lower content of low molecular weight polypropylene volatiles, thus reducing the risk of migration in food packaging applications, and
- broader molecular weight distribution, thus improving for example processability, in particular in injection-molding, and mechanical properties such as creep.

DETAILED DESCRIPTION OF THE INVENTION

The polymerization of propylene and one or more optional comonomers is performed in presence of a Ziegler-Natta catalyst, an organoaluminium compound and an optional external donor.

The Ziegler-Natta catalyst comprises a titanium compound having at least one titanium-halogen bond, and an internal donor, both supported on magnesium halide in active form. For the present invention it is essential that the internal donor of the Ziegler-Natta catalyst is a diether or comprises a diether together with a different internal donor, provided that the Ziegler-Natta catalyst comprising such a mixture of internal donors shows comparable polymerization behavior as a Ziegler-Natta catalyst with only diether as internal donor. A mixture of internal donors could for example comprise a diether and a phthalate.

Ziegler-Natta catalysts comprising a diether as internal donor are well-known in the art and can for example be obtained by reaction of an anhydrous magnesium halide with an alcohol, followed by titanation with a titanium halide and reaction with a diether compound as internal donor. Such a catalyst comprises about 2.5-7.5 wt % of titanium, about 10-20 wt % of magnesium and about 5-30 wt % of internal donor with chlorine and solvent making up the remainder.

Particularly suited as internal donors are 1,3-diethers of formula $R^1R^2C(CH_2OR^3)(CH_2OR^4)$ wherein $R^1$ and $R^2$ are the same or different and are $C_1$-$C_{18}$ alkyl, $C_3$-$C_{18}$ cycloalkyl or $C_7$-$C_{18}$ aryl radicals; $R^3$ and $R^4$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP361493 and EP728769. Representative examples of said diethers are 2-methyl-2-isopropyl-1,3-dimethoxypropane; 2,2-diisobutyl-1,3-dimethoxypropane; 2-isopropyl-2-cyclo-pentyl-1,3-dimethoxypropane; 2-isopropyl-2-isoamyl-1,3-dimethoxypropane; 9,9-bis(methoxymethyl)fluorene.

Ziegler-Natta catalysts comprising a diether as internal donor are for example commercially available from Basell under the Avant ZN tradename.

The organoaluminium compound is advantageously an Al-alkyl compound of the Al-trialkyls family, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. Al-triethyl is preferred.

Suitable external donors include certain silanes, ethers, esters, amines, ketones and heterocyclic compounds. It is preferred to use a 1,3-diether as described above or a silane. It is most preferred to use silanes of the general formula $R^a{}_pR^b{}_qSi(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl) Si(OCH$_3$)$_2$ (referred to as "C donor"), (phenyl)$_2$Si(OCH$_3$)$_2$ and (cyclopentyl)$_2$ Si(OCH$_3$)$_2$ (referred to as "D donor").

The use of such catalysts for the production of polypropylene is known in the art. For example, EP 1 206 499 (=WO 01/92406) by Basell discloses a random heterophasic copolymer wherein the matrix is a random copolymer of propylene and ethylene that is produced using a Ziegler-Natta catalyst with a diether as internal donor. The document discloses specific examples with 2.5 resp. 2.8 wt % of ethylene and a melt flow index of 1.7 resp. 2.2 dg/min for the matrix. However, it is not disclosed how to arrive at polypropylenes of higher melt flow.

Surprisingly, it has now been found that a Ziegler-Natta catalyst with a diether as internal donor can be used to produce high melt flow polypropylenes without loss in production rate if the polymerization conditions are suitably modified.

The polymerization of propylene and one or more optional comonomers can be carried out according to known techniques. The polymerization can for example be carried out in liquid propylene as reaction medium. It can also be carried out in a diluent, such as an inert hydrocarbon (slurry polymerization) or in the gas phase.

For the present invention the polymerization is preferably carried out in liquid propylene at temperatures in the range from 20° C. to 100° C. Preferably, temperatures are in the range from 60° C. to 80° C. The pressure can be atmospheric or higher. It is preferably between 25 and 50 bar. The molecular weight of the polymer chains, and in consequence of the melt flow of the polypropylene, is regulated by adding hydrogen.

In the production of random copolymers, i.e. the copolymerization of propylene and at least one comonomer, the use of an external donor is essential for controlling the solubles (as measured by the percentage of xylene solubles); an increase in the concentration of external electron donor leads to a decrease in xylene solubles. The addition of ethylene as co-monomer drastically increases the amount of solubles. The use of external donor is even more interesting when high melt flows are targeted because of the lower average molecular weight polymer chains that are more easily soluble. Furthermore, too high soluble content is detrimental for most final applications and can even yield polymers that do not conform with specific regulations as for example food contact applications or pharmacopoeia applications. If the solubles are not controlled, polypropylene powder may stick in the polymerization reactor or in the transfer lines.

However, donor usage is highly detrimental to catalyst activity, especially with diether containing catalysts. To circumvent these drawbacks and produce polymers with low levels of xylene solubles and acceptable productivity the Al concentration in the polymerization medium is advantageously reduced. Advantageously, the upper limit for the Al concentration, by weight relative to the added monomer(s), in the polymerization medium is 75 ppm, preferably 50 ppm, more preferably 25 ppm, even more preferably 20 ppm, still more preferably 15 ppm, and most preferably 12 ppm. Advantageously, the lower limit for the Al concentration, by weight in the polymerization medium is 1 ppm, preferably 2 ppm, more preferably 4 ppm, even more preferably 5 ppm, still more preferably 6 ppm, and most preferably 7 ppm.

The molar ratio of organoaluminium compound to external donor ("Al/ED") ranges advantageously between 1 and 20. The upper limit of the Al/ED ratio is preferably 15, more preferably 10 and most preferably 8. The lower limit of the Al/ED ratio is preferably 3, and more preferably 5.

The production rate of the polymerization of the present invention is equal to or higher than 500 kg of propylene polymer per g titanium. Preferably, it is higher than 750 kg, more preferably higher than 1000 kg, even more preferably higher than 1250 kg of propylene polymer per g titanium.

The MFI (ASTM D 1238 condition L) of the polypropylenes produced according to the present invention is between 45 to 150. In a preferred embodiment the lower value is at least 50, preferably 55, more preferably 60, still more preferably 65, more preferably 70. Advantageously the upper value is 120, preferably 100, more preferably 90. Advantageously the MFI range is any combination of previous lower values and upper values. The MFI is adjusted as a function of hydrogen in the polymerization medium.

According to the present invention the propylene polymers with high melt flow are directly obtained in the polymerization reaction without subsequent degradation with peroxydes or other melt flow increasing agents, i.e. no melt flow increasing agents are added to the propylene polymer once it has left the polymerization reactor.

Advantageously the polymer of the invention is a random copolymer of propylene and one or more comonomers, such as for example alpha-olefins different from propylene, such as ethylene, 1-butene, 1-pentene, 1-hexene and 1-octene. The comonomer content is advantageously comprised, by weight, between 2 wt % and 6 wt %, preferably between 2.5 wt % and 5 wt %. Ethylene is the preferred comonomer. The ethylene content is advantageously comprised, by weight, between 2 wt % and 6 wt %, preferably between 2.5 wt % and 5 wt %.

The xylene soluble fraction of the random copolymer according to the present comprises less than 10 wt % (with respect to the total random copolymer weight), advantageously between 5 and 8%.

The propylene polymers produced in accordance with the present invention have a molecular weight distribution in the range from 4 to 7.

The propylene polymers produced in accordance with the present invention show a high randomness of ethylene insertion The average block length of ethylene blocks is equal to or less than 1.5 ethylene units, preferably equal to or less than 1.3 ethylene units, more preferably equal to or less than 1.2 ethylene units. The percentage of ethylene molecules incorporated into the polymer chain as single units is higher than 50%, preferably higher than 60%, even more preferably higher than 70% and most preferably higher than 80%.

The isotacticity of the propylene polymers is higher than 95% mmmm-pentades (as measured by NMR-spectroscopy), preferably higher than 96%, more preferably higher than 97%, even more preferably higher than 98%.

The polypropylene is separated from the reaction medium (liquid propylene or hydrocarbon such as, by way of example, isohexane) and unreacted gases (propylene, hydrogene and optionally alpha olefine) recovered as a powder and optionally converted to pellets.

The polypropylene may contain additives such as, by way of example, antioxidants, light stabilizers, acid scavengers, lubricants, antistatic additives, nucleating/clarifying agents, colorants.

The polypropylenes produced according to the present invention may be nucleated and/or clarified. They are characterised by excellent transparency. An overview of suitable nucleating and clarifying agents can be found in Plastics Additives Handbook, ed. H. Zweifel, $5^{th}$ edition, 2001, Hanser Publishers, pages 949-971. Examples for suitable nucleating and/or clarifying agents are dibenzylidene sorbitol compounds, benzoate salts, talc, metal salts of cyclic phosphoric esters, disodium bicyclo[2.2.1]heptanedicarboxylate, or any blend of these.

The propylene polymers obtained by the process of the present invention may be transformed into articles by a transformation method selected from the group consisting of selected from the group comprising injection molding, compression molding, injection blow molding and injection stretch blow molding, Preferably the method of transformation is injection molding.

The articles of the present invention are selected from the group consisting of food or non-food packaging, retort packaging, housewares, cap, closure, media packaging, a medical device and pharmacopoeia package. They can also contain one or more living hinges.

Due to their high melt flow values the propylene polymers are especially suited for articles with a flow length to wall thickness ratio equal to or higher than 50, preferably equal to or higher than 100, more preferably equal to or higher than 200, even more preferably equal to or higher than 250, and most preferably equal to or higher than 300.

The articles into which the propylene polymers are transformed have a wall thickness in the range from 100 μm to 2 mm. Preferably, the lower limit for thickness is 200 μm, more preferably it is 250 μm. Preferably the upper limit for thickness is 1.5 mm, even more preferably it is 1.0 mm.

The articles may also be transparent with a haze value of equal to or less than 40%, preferably equal to or less than 20%, based on a thickness of 1 mm and measured on injection-molded test specimens.

EXAMPLES

Flexural modulus was measured according to ISO 178: 2001, Izod impact strength according to ISO 180:2000. The melt flow (MFI) is measured according to norm ASTM D 1238, condition L.

Haze is measured on injection-molded test specimens of 1 mm thickness. The measurement is done according to standard method.

Polymerization and Polymer Properties

The polymerizations were conducted either in a pilot plant loop reactor (examples 1 and 3) or in a commercial scale loop reactor (examples 2 and 4) in liquid propylene. Polymerization conditions and polymer properties are given in table 1. All examples were conducted using Avant ZN 126 M, a Ziegler-Natta catalyst with a diether as internal donor purchased from Basell, as polymerization catalyst. The temperature given in table I designates the temperature of the polymerization medium External donor C denotes (cyclohexyl) (methyl) Si(OCH$_3$)$_2$. Hydrogen in appropriate concentrations was used for melt flow control.

Xylene solubles (XS) are determined as follows: Between 4.5 and 5.5 g of polypropylene are weighed into a flask and 300 ml xylene are added. The xylene is heated under stirring to reflux for 45 minutes. Stirring is continued for 15 minutes exactly without heating. The flask is then placed in a thermostat bath set to 25° C.+/−1° C. for 1 hour. The solution is filtered through Whatman n° 4 filter paper and exactly 100 ml of solvent are collected. The solvent is then evaporated and the residue dried and weighed. The percentage of xylene solubles ("XS") is then calculated according to $XS(\text{in wt \%}) = (\text{Weight of the residue/Initial total weight of } PP)*300$

TABLE I

|  | unit | Ex 1 (comp.) | Ex 2 (comp.) | Ex 3 | Ex 4 |
|---|---|---|---|---|---|
| Catalyst | — | ZN 126 | ZN 126 | ZN 126 | ZN 126 |
| External Donor | — | C | C | C | C |
| Temperature | ° C. | 70 | 68 | 70 | 66 |
| Al | ppm | 7 | 35 | 7 | 35 |
| Al/ED (molar ratio) | — | 5.5 | 6 | 6.5 | 6 |
| Catalyst productivity | kg PP/g Ti | 1430 | 1000 | 1860 | 1000 |
| MFI | dg/min. | 32 | 39 | 90 | 80 |
| Molecular weight distribution |  | 5.9 | 5.6 | 5.3 | 5.6 |
| Ethylene | wt % | 3.5 | 3.3 | 2.1 | 3.5 |
| Xylene solubles | wt % | 8.3 | 6.5 | 5.4 | 6.0 |
| Flexural modulus | MPa | 1127 | 1107 | 1224 | 1110 |
| IZOD +23° C. (notched) | kJ/m² | 4.7 | 4.4 | 2.7 | 3.7 |
| Clarifying agent | — | yes | yes | no | yes |

The results clearly show that high catalytic activity can be reached with external donor with lower soluble content.

Volatiles

The content of volatiles in the polymer was determined as follows: Polymer samples were heated in an oven to 150° C. Organic volatiles were purged from the oven through a Tenax absorber tube kept at −30° C. The organic volatiles are then injected into a gas chromatograph by reheating the absorber cartridge to 240° C. Analysis of the volatiles was performed on a gas chromatograph under respective standard conditions.

The polypropylene of example 4 was analysed for organic volatiles and compared to a prior art random copolymer of melt flow 40 dg/min, designated as example 5, which was produced by visbreaking with an organic peroxide, and also a random copolymer of melt flow 40 produced according to the present invention, i.e. without visbreaking, designated as example 6. Results are shown in table II.

TABLE II

|  | unit | Ex. 5 (comp.) | Ex. 6 (comp.) | Ex. 4 |
|---|---|---|---|---|
| MFI | dg/min | 40 | 40 | 80 |
| ethylene | wt % | 3 | 3.5 | 3.5 |
| total $C_3$-$C_4$ | ppm | 11 | n.d. | n.d. |
| acetone | ppm | 38 | n.d. | n.d. |
| n-pentane | ppm | 2 | n.d. | n.d. |
| tert-butanol | ppm | 29 | n.d. | n.d. |
| total $C_6$ | ppm | 21 | 2 | 1 | n.d. = not detected, i.e. below the detection limit of 0.5 ppm.

The results show that a polypropylene produced according to the present invention has a much reduced volatile content.

The invention claimed is:

1. A process for the production of propylene polymers having a melt flow index ranging from 45 to 150 dg/min as measured by ASTM D 1238 condition L directly in a polymerization reactor without the subsequent use of melt flow increasing agents, said process comprising the step of polymerizing propylene and one or more comonomers in presence of a Ziegler-Natta catalyst comprising a titanium compound having at least one titanium-halogen bond, and a diether compound as internal electron donor, both supported on a magnesium halide in active form, an organoaluminium compound in such an amount that the aluminium concentration, by weight relative to the added monomer, in the polymerization medium ranges from 1 to 75 ppm, an external electron donor, and hydrogen, wherein the molar ratio of organoaluminium compound to external electron donor ranges from 1 to 20.

2. The process according to claim 1, in which the diether is a 1,3-diether of the general formula $R^1R^2C(CH_2OR^3)(CH_2OR^4)$ wherein $R^1$ and $R^2$ are the same or different and are $C_1$-$C_8$ alkyl, $C_3$-$C_{18}$ cycloalkyl or $C_7$-$C_{18}$ aryl radicals; $R_3$ and $R_4$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations.

3. The process according to claim 1, wherein the aluminium concentration, by weight relative to the added monomer(s), in the polymerization medium ranges from 2 to 50 ppm.

4. The process according to claim 1, in which the molar ratio of organoaluminium compound to external electron donor ranges from 3 to 8.

5. The process according to claim 1, wherein the catalyst productivity is equal to or higher than 850 kg of propylene polymer produced per gram titanium.

6. The process according to claim 1, wherein the propylene polymer comprises an alpha-olefin as comonomer.

7. The process according to claim 1, wherein the propylene polymer comprises from 2 wt % and 6 wt % of comonomer.

8. The process according to claim 1, wherein the propylene polymer comprises ethylene.

9. The process according to claim 8, wherein the propylene polymer comprises from 2 wt % to 6 wt % of ethylene.

10. The process according to claim 8, wherein the propylene polymer comprises from 2.5 wt % to 5 wt % of ethylene.

11. The process according to claim 1, wherein the propylene polymer is a random copolymer.

12. A process for producing an article comprising the steps of (a) producing a propylene polymer having a melt flow index ranging from 45 to 150 dg/min as measured by ASTM D 1238 condition L directly in a polymerization reactor without the subsequent use of melt flow increasing agents, said process comprising the step of polymerizing propylene and one or more comonomers in presence of aa Ziegler-Natta catalyst comprising a titanium compound having at least one titanium-halogen bond, and a diether compound as internal electron donor, both supported on a magnesium halide in active form, an organoaluminium compound in such an amount that the aluminium concentration, by weight relative to the added monomer(s), in the polymerization medium ranges from 1 to 75 ppm, an external electron donor, and hydrogen, wherein the molar ratio of organoaluminium compound to external electron donor ranges from 1 to 20, (b) recovering a propylene polymer having a melt flow index ranging from 45 to 150 dg/min as measured by ASTM D 1238 condition L directly from the polymerization reactor without the subsequent use of melt flow increasing agents, and (c) transforming the polymer to make an article.

13. The process according to claim 12, wherein the article has a wall thickness in the range from 100 μm to 2 mm.

14. The process according to claim 12, wherein the article has a flow length to wall thickness ratio equal to or higher than 100.

15. The process according to claim 12, wherein the article is selected from the group consisting of food or non-food packaging, retort packaging, housewares, cap, closure, media packaging, a medical device and pharmacopoeia package.

16. The process according to claim 12, wherein the article comprises a living hinge.

17. The process according to claim 12, wherein the article is transparent with a haze value of equal to or less than 40% based on a thickness of 1 mm and measured on injection-molded test specimens.

18. The process according to claim 12, wherein the method of transforming in step (c) is selected from the group comprising injection molding, compression molding, injection blow molding and injection stretch blow molding.

19. A polypropylene polymer produced by the process of claim 1.

20. An article produced by the process of claim 12.

* * * * *